(12) United States Patent
Louni et al.

(10) Patent No.: US 9,959,365 B2
(45) Date of Patent: May 1, 2018

(54) METHOD AND APPARATUS TO IDENTIFY THE SOURCE OF INFORMATION OR MISINFORMATION IN LARGE-SCALE SOCIAL MEDIA NETWORKS

(71) Applicant: The Trustees of the Stevens Institute of Technology, Hoboken, NJ (US)

(72) Inventors: Alireza Louni, San Francisco, CA (US); Koduvayur Parthasarathy Subbalakshmi, Holmdel, NJ (US)

(73) Assignee: THE TRUSTEES OF THE STEVENS INSTITUTE OF TECHNOLOGY, Hoboken, NJ (US)

( * ) Notice: Subject to any disclaimer, the term of this patent is extended or adjusted under 35 U.S.C. 154(b) by 0 days. days.

(21) Appl. No.: 15/000,604

(22) Filed: Jan. 19, 2016

(65) Prior Publication Data

US 2016/0212163 A1    Jul. 21, 2016

Related U.S. Application Data

(60) Provisional application No. 62/104,211, filed on Jan. 16, 2015.

(51) Int. Cl.
*G06F 17/00* (2006.01)
*G06F 17/30* (2006.01)
*H04L 29/06* (2006.01)

(52) U.S. Cl.
CPC ...... *G06F 17/30958* (2013.01); *H04L 63/126* (2013.01); *H04L 63/1408* (2013.01)

(58) Field of Classification Search
CPC ........... G06F 11/2033; G06F 17/30958; G06F 2201/85; H04L 63/126; H04L 63/1408; H04L 67/10; H04L 67/32; H04W 40/02; H04W 88/04
See application file for complete search history.

(56) References Cited

U.S. PATENT DOCUMENTS

| 9,292,493 B2 | 3/2016 | Chandramouli et al. |
| 2004/0018839 A1* | 1/2004 | Andric ............... H04L 12/2856 455/433 |
| 2011/0173264 A1* | 7/2011 | Kelly ..................... G06Q 10/10 709/205 |

OTHER PUBLICATIONS

Doerr et al.; Why rumors spread so quickly in social networks; Commun. ACM 55(6), 70-75 (2012).
(Continued)

*Primary Examiner* — Abiy Getachew
(74) *Attorney, Agent, or Firm* — Greenberg Traurig, LLP

(57) ABSTRACT

A system and method of detecting a source of a rumor in a social media network is disclosed. The social media network includes a plurality of node clusters, each of the plurality of nodes therein having at least one edge connection to a corresponding number of different nodes in the same cluster. The system identifies a plurality of gateway nodes, each having at least one weak tie connection with a corresponding gateway node from a different node cluster; selects a subset of gateway nodes as sensors to measure arrival times of a rumor; and selects a candidate node cluster based on these arrival times. From there, the system selects a set of nodes in the candidate cluster to measure arrival times of a rumor from a source node, and selects a candidate node from the candidate cluster as having a high probability of being the source node.

13 Claims, 8 Drawing Sheets

(56) References Cited

OTHER PUBLICATIONS

Hill et al.; Network-based marketing: Identifying likely adopters via consumer networks; Statistical Science 21(2), 256-276 (2006).
Comin et al. Identifying the starting point of a spreading process in complex networks. Phys. Rev. E 84,056-105 (2011).
Sabidussi; The centrality index of a graph; Psychometrika 31(4), 581-603 (1966).
Newman; The structure and function of complex networks. SIAM Rev. 45,167-256 (2003).
Kermack, et al.; A contribution to the mathematical theory of epidemics; Proceedings of the Royal Society of London; Series A 115(772), 700-721 (1927).
Shah; Detecting sources of computer viruses in networks: theory and experiment; In: Proceedings of the ACM Sigmetrics International Conference on Measurement and Modeling of Computer Systems. Sigmetrics '10, pp. 203-214 (2010).
Shah et al.; Rumors in a network: Who's the culprit?; Information Theory, IEEE Transactions on 57(8), 5163-5181 (2011).
Shah; et al.; Rumor centrality: a universal source detector; In: Proceedings of the 12th ACM SIGMETRICS/Performance Joint International Conference on Measurement and Modeling of Computer Systems. SIGMETRICS '12, pp. 199-210 (2012).
Luo et al.; Identifying multiple infection sources in a network; In: Signals, Systems and Computers (ASILOMAR), 2012 Conference Record of the Forty Sixth Asilomar Conference on, pp. 1483-1489 (2012).
Prakash et al.; Spoiling culprits in epidemics: How many and which ones?; In: Data Mining (ICDM), 2012 IEEE 12th International Conference On, pp. 11-20 (2012).
Pinto et al.; Locating the source of diffusion in large-scale networks; Phys. Rev. Lett. 109, 068-702 (2012).
Luo et al.; How to identify an infection source with limited observations. Selected Topics in Signal Processing, IEEE Journal of 8(4), 586-597 (2014).
Louni et al.: A two-stage algorithm to estimate the source of information diffusion in social media networks; 2014 IEEE Conference on Computer Communications Workshops (IFOCOM WKSHPS); 329-333 (2014).
Xiang et al.; Modeling relationship strength in online social networks; In: Proceedings of the 19th International Conference on World Wide Web. WWW '10, pp. 981-990 (2010).
Weng et al.; Competition among memes in a world with limited attention; Sci. Rep. 2(335) (2012).
Pfeiffer III et al.; Methods to determine node centrality and clustering in graphs with uncertain structure; In Proceedings of the 5th International AAAI Conference on Weblogs and Social Media (2011).
Bakshy et al.; The role of social networks in information diffusion; In: Proceedings of the 21st International Conference on World Wide Web. WWW '12, pp. 519-528 (2012).
Granovetter; The strength of weak ties; The American Journal of Sociology 78(6), 1360-1380 (1973).
Blondel et al.; Fast unfolding of communities in large networks; J. Stat. Mech, 10008 (2008).
Bonacich; Power and centrality: A family of measures; American Journal of Sociology 92(5), 1170-1182 (1987).
Comaniciu et al.; Mean shift: a robust approach toward feature space analysis; Pattern Analysis and Machine Intelligence, IEEE Transactions on 24(5), 603-619 (2002).
Potamias et al.; K-nearest neighbors in uncertain graphs; Proc. VLDB Endow, 3(1-2), 997-1008 (2010).
Barry, K.: "Ford Bets the Fiesta on Social Networking," Wired (Apr. 2009).
Jackson, M.O., Social and Economic Networks, Princeton University Press, Princeton, NJ, USA (Draft Date: Mar. 2008).
Louni, A., et al., "Who Spread that Rumor: Finding the Source of Information in Large Social Networks with Varying Inter-Node Relationship Strengths" (Jan. 2015).
Morozov, E., "Swine Flu: Twitter's Power to Misinform," Foreign Policy (Apr. 28, 2009).
Newman, M., "Fast Algorithm for Detecting Community Structure in networks," Phys. Rev. E, vol. 69, p. 066133 (Jun. 18, 2004).
Strauss, G. et al., "SEC, FBI Probe Fake Tweet That Rocked Stocks," USA Today (Apr. 24, 2013).

* cited by examiner

METHOD AND APPARATUS TO IDENTIFY THE SOURCE OF INFORMATION OR MISINFORMATION IN LARGE-SCALE SOCIAL MEDIA NETWORKS

STATEMENT REGARDING RELATED APPLICATIONS

This application claims priority to Provisional Patent Application Ser. No. 62/104,211, filed Jan. 16, 2015, the disclosure of which is incorporated by reference herein in its entirety.

FIELD OF THE INVENTION

The present invention relates to the field of social media networks, and more particularly to a system and method of determining the source of a rumor or piece of information from within a social media network.

BACKGROUND OF THE INVENTION

Social media networks have experienced a meteoric rise in popularity. Information spread much faster in social networks than any other communication method as of this writing. This ease of information dissemination can be a double-edged sword, however, as social networks can also be used to spread rumors or computer malware. In such circumstances, detecting and determining the source of rumors or misinformation in a social network becomes valuable as a part of an affected party's damage control.

One potential source of information/misinformation may be a result of a node with a high degree of centrality (e.g., a node with a large number of friends on Facebook). This, however, is unlikely, because, in general, every node in a social network has the potential to spread information/misinformation.

It may be possible to use information from a snapshot of infected nodes to identify the source of information/misinformation. This requires the assumption that all nodes in the network monitor and report their status, which is not practical in large-scale social networks. Furthermore, this assumes that the underlying social graph is a regular tree. In general, however, an underlying social graph can be any type of graph.

It may also be possible to use a subset of nodes (called sensors) in the social network to find the source of information/misinformation. The foregoing methods require a large number of nodes in the network to act as sensors which is generally impractical. Furthermore, these methods do not consider the varying inter-node relationship strengths.

SUMMARY OF THE INVENTION

In view of the foregoing background, a system and method of detecting a source of a rumor in a social media network is disclosed. The system and method involves identifying a plurality of node clusters in the network, each of the plurality of node clusters including a plurality of nodes, each of the plurality of nodes from each of the plurality of node clusters having at least one edge connection defined by a connection to a different node from a same one of the node clusters; identifying a plurality of gateway nodes from each of the plurality of node clusters, each gateway node from each of the plurality of node clusters as having at least one weak tie connection with a corresponding gateway node from a different one of the plurality of node clusters; selecting a subset of the plurality of gateway nodes as sensor nodes; measuring arrival times of the information from a source node at each of the sensor nodes; selecting a candidate node cluster from the plurality of node clusters based on high betweenness centrality, the candidate node cluster having a high probability of including the source node from among its corresponding plurality of nodes; selecting a subset of the plurality of nodes in the candidate cluster as candidate sensor nodes; measuring arrival times of the information from a source node at each of the candidate sensor nodes; and selecting a candidate node from the candidate cluster based on high betweenness centrality, the candidate node having a high probability of being the source node.

BRIEF DESCRIPTION OF FIGURES

For a more complete understanding of the present invention, reference is made to the following detailed description of an embodiment considered in conjunction with the accompanying drawings, in which.

DETAILED DESCRIPTION OF THE INVENTION

The following disclosure is presented to provide an illustration of the general principles of the present invention and is not meant to limit, in any way, the inventive concepts contained herein. Moreover, the particular features described in this section can be used in combination with the other described features in each of the multitude of possible permutations and combinations contained herein.

All terms defined herein should be afforded their broadest possible interpretation, including any implied meanings as dictated by a reading of the specification as well as any words that a person having skill in the art and/or a dictionary, treatise, or similar authority would assign particular meaning.

Further, it should be noted that, as recited in the specification and in the claims appended herein, the singular forms 'a,' "an," and "the" include the plural referents unless otherwise stated. Additionally, the terms "comprises" and "comprising" when used herein specify that certain features are present in that embodiment. However, this phrase should not be interpreted to preclude the presence or inclusion of additional steps, operations, features, components, and/or groups thereof.

The present disclosure generally relates to a system and process for finding the source of a rumor or other form of information/misinformation in a social network. More particularly, the present system involves finding a candidate cluster from the plurality of clusters in the network, the candidate cluster having a high probability of containing the source of diffusion of a rumor, and then searching the candidate cluster to locate the specific source node. This process is especially suited to social networks with uncertain inter-node relationship strengths, as the randomness of inter-node relationship strengths is quantified through a probabilistic weighted graph in which the uncertainty in the network is modeled by a probability mass function (pmf).

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces.

Figure 1:
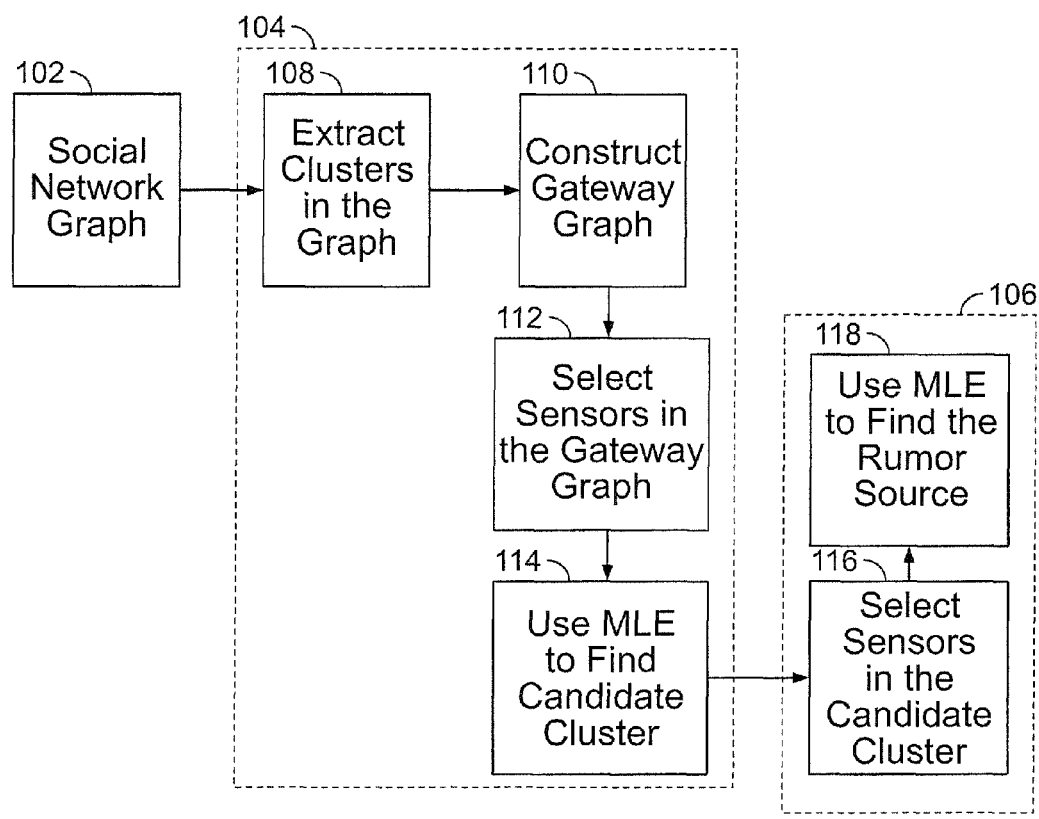
FIG. 1 is a flow chart illustrating a process of identifying a source of information/misinformation in a social network in accordance with an embodiment of the present invention.

Turning to FIG. 1, a flow chart illustrating a high-level view of a system and method for detecting a source of a rumor or other information in a social media network in accordance with one embodiment of the present invention is shown. At the outset, one is presented with a social network, such as those found on services such Twitter and Facebook. The social network can be modeled as a graph (step 102), with nodes representing entities within the social network (i.e., the various personal Twitter and Facebook accounts set up by members of the public) from which a rumor or piece of information can emanate. A diagram of an example social network 10 is shown in FIG. 2.

Figure 2:
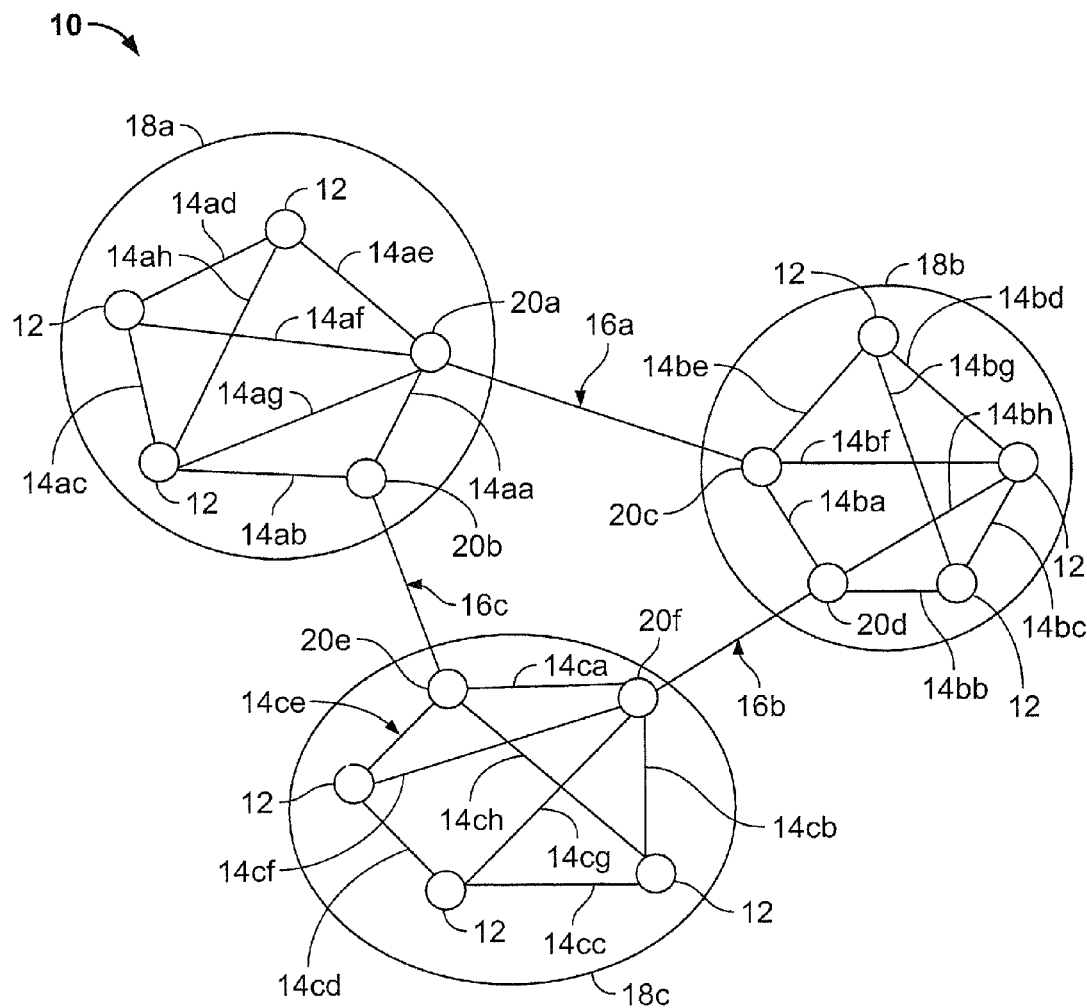
FIG. 2 is a diagram showing an example of a social network with three clusters.

As seen in FIG. 2, each node 12 in the network 10 shares a connection (e.g., connections 14aa-ah, 14ba-bh, and 14ca-ch, and connections 16a-c) with at least one other node 12 through which information can be passed or shared.

Figure 11:
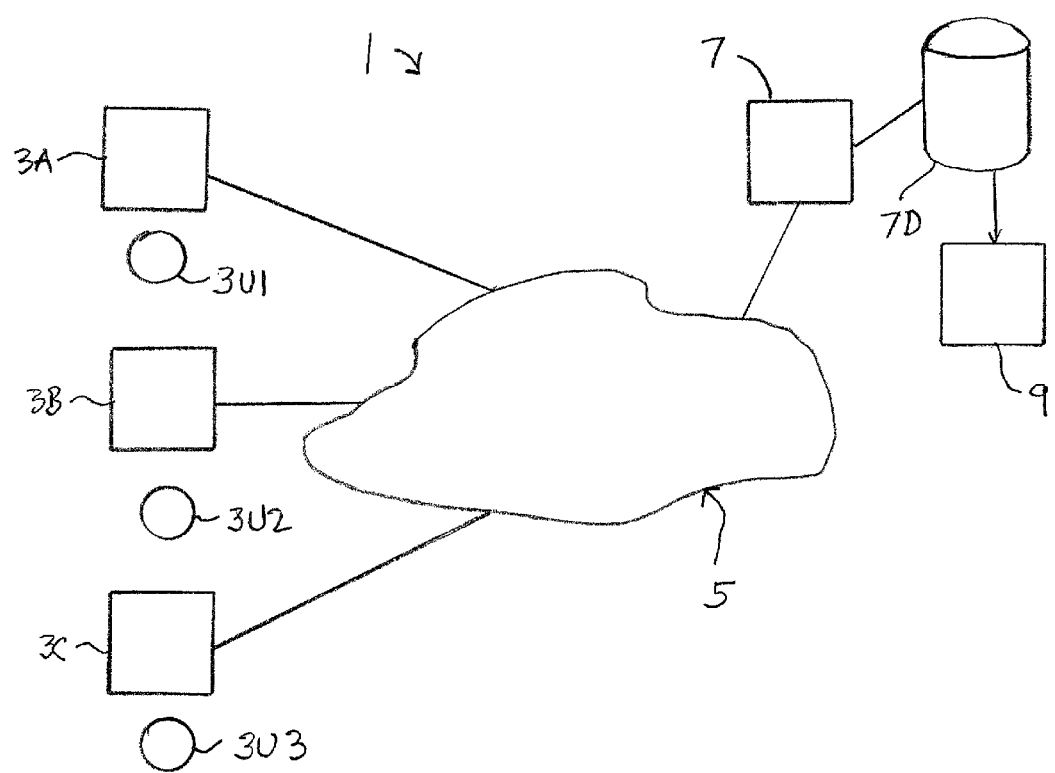
FIG. 11 is a diagram of a system in accordance with an exemplary embodiment of the present disclosure.

FIG. 11 shows a system 1, having a plurality of computers 3A-3C connected to a network 5, e.g., the Internet. A server computer 7 provides an application program, such as Facebook® or Twitter® that allows users 3U1, 3U2, 3U3 to establish communicative relationships, e.g., by opting to allow another user to view content that another user "posts" (stores in the database 7D maintained and accessed (wrote to/read from) by the server computer 7 running a service application, e.g., Facebook or Twitter). These communicative relationships or connections may be established by entering user 3U1, 3U2, 3U3 data into the database 7D. For example a given user, 3U1 may enter another user's email address or other identifier and classify that other user as having viewing rights for their posts on the service provided by the server computer 7. As a result, the network connections between users 3U1, 3U2, etc. have a digital representation in the database 7D and are implemented by the server computer 7 when it executes the service application program. The server computer 7 may record all data exchanges and data states over time, such that a time-stamped record of all data sharing activities, as well as the content of data shared, may be maintained in the database 7D. This data sharing and flow information may be analyzed by a computer programmed in accordance with the present disclosure, either in the form of a separate computer 9 having access to the database 7D or the server computer 7, programmed to execute the processing disclosed herein. In this context, the computers 3A-3C are physical nodes in a physical network and the users' 3U1-3U3 virtual presence in the communicative construct defined by the service application program, e.g., Facebook or Twitter are computer implemented nodes having an existence in the logic of the application program and the data representing the users. References to nodes comprehend the foregoing.

The connections/relationships involved in data sharing may be considered "edges" between the nodes and can be based upon a variety of things, such as personal relationships, geographic proximity, commonly held interests, etc. The connections which offer the least resistance to information being shared from one node to another are considered strong ties (see connections 14aa-ah, 14ba-bh, and 14ca-ch), while the connections which have offer the strongest such resistance are considered weak ties (see connection 16a-c). Social networks can thus be viewed as comprising several clusters of nodes (see clusters 18a, 18b, and 18c), each of which having a plurality of strong ties connecting the nodes therein (see connections 14aa-ah, 14ba-bh, and 14ca-ch), while the clusters 18a-c themselves are interconnected via weak ties (see connections 16a, 16b, and 16c). The strong ties between any given cluster of nodes indicates that the nodes therein frequently interact with each other and are responsible for dissemination of information within a cluster. By comparison, the weak ties between the different clusters enable information to go "viral" and spread throughout the various clusters of a social network.

The strength of these connections can be quantified by assigning numerical weights to these connections (i.e., between 0 and 1) to represent the strengths of the relationship between these nodes, where a weight of 0 represents the least resistance to propagation of information (i.e., a strong tie) and a weight of 1 represents the greatest resistance to such propagation along that connection. Since relationships between nodes can rise and fall due to changing circumstances (e.g., losing old friendships and gaining new ones; changing levels of interest in certain subject matter), the strengths of these connections can vary over time. In such circumstances, the system and method disclosed below samples the network and weights of these connections at specific time intervals, yielding data sets that are simpler to analyze.

For example, let $w_{ij}$ be the weight of the $i^{th}$ connection at some instance j, with the number of distinct values for the weight of the connection i be $M_i$. We can now construct an $|E| \times M$ matrix of weights, $W=[w_1, w_2, \ldots, w_M]$, where $M=\Pi_{i=1}^{|E|} M_i$. The $i^{th}$ column of this matrix is a vector, $w_i$, with elements representing one possible combination of weights for each connection. We can then construct one graph, $G_i=(V, E, w_i)$ for every vector $w_i$, where V and E denote the set of nodes and connections, respectively. Assuming weight independence among connections, the probability of occurrence of graph $G_i$ is given by the following formula:

$$Pr(G_i) = \prod_{i=1}^{|E|} Pr(w_{ij}).$$

Figure 3:
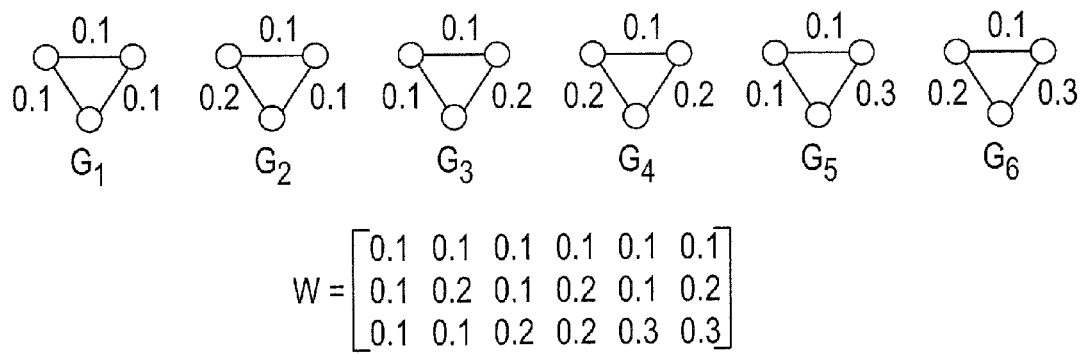
FIG. 3 is a graph of connections (edges) between nodes in a 3-node cluster, the graph showing edges with randomly varying weights, where W is the matrix of possible weights for the three edges in a 3-node network.

FIG. 3 is a graph of a group of three-nodes showing the possible weight distributions across the three connections therein. In FIG. 3, W is the matrix of possible weights for the three connections in the graph. The connections take on weight values from different sets. For example, as seen in FIG. 3, connection $e_1$ always has weight of 0.1, $e_2$ can have weight values from the set $\{0.1, 0.2\}$ and $e_3$ can have weight values from the set $\{0.1, 0.2, 0.3\}$.

In one example, let the unknown source of rumor, $v^* \in V$, initiate the rumor at an unknown time $t^*$. Since there is no prior knowledge about $v^*$, all nodes are equally likely to be the source node. Moreover, each node can be either suspected or infected, and any susceptible node can become infected independently of other nodes. We assume that the rumor diffuses along the shortest path between the source $v^*$ and each node $v \in V$. The time taken for a node m to repost information from n to its own neighbors on the network $G_i$ depends on the strength of the social tie between m and n. It takes less time for any piece of information to diffuse inside a dense cluster of strong ties than across weak ties. Moreover, nodes repost what their neighbors posted with different time delay values (e.g. depending on the time of day that they are online). Assuming a Gaussian distribution for the information propagation delay along each edge $e_i \in E$, the time, $d_i$, it takes for information from the corresponding node to reach its susceptible neighbor when the weight of the tie is $w_{ij}$ is statistically distributed as the following:

$$d_i | w_{ij} \sim N(w_{ij} \cdot \mu_{max}, \sigma_{ij}^2)$$

where the average information propagation delay for the weakest social relationship ($w_{ij}=1$) is $\mu_{max}$.

Referring back to FIG. 1, the present system 1 implements a two stage process for determining the source of information (e.g., a rumor) in such a social network. The first stage 104 involves finding a candidate cluster from the plurality of clusters (e.g., clusters 18a-c) in a social network, the candidate cluster being the cluster having the highest probability of including the source of diffusion for a rumor or piece of information. Once this candidate cluster has been selected, the second stage 106 involves searching within the candidate cluster to find a node having the highest probability of being the source of diffusion.

Figure 4:
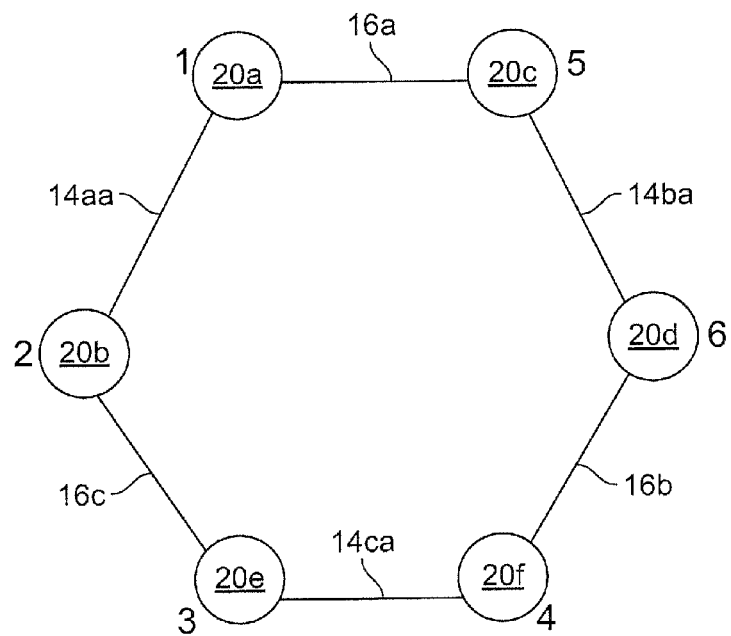
FIG. 4 is a diagram of a set of gateway nodes isolated from the social network shown in FIG. 2.

The first stage 104 begins with identifying and extracting the clusters in a social network (step 108). This process will result in a model of a social network similar to that seen in FIG. 2. Once these clusters 18a-c have been identified, the system identifies the gateway nodes 20a-f of the clusters 18a-c and their interconnections, $G_i^{gate}=(V^{gate}, E^{gate}, w_i^{gate})$ (step 110). Gateway nodes are nodes within a cluster which connect to gateway nodes in a different cluster. Each gateway node shares at least one weak tie with a corresponding one gateway node in a different cluster. Such gateway nodes may also share strong ties with other gateway nodes within the same cluster. For example, as seen in FIG. 2, gateway node 20a shares a strong tie (connection 14aa) with gateway node 20b, as both gateway nodes 20a and 20b are part of the same cluster 18a. Gateway node 20a also shares a weak tie (connection 16b) with gateway node 20c, which is part of a different cluster 18b. This inter-node relationship between the gateway nodes 20a-f can be mapped to a graph for analysis, as seen in FIG. 4, which is a graph consisting of the gateway nodes 20a-f and their interconnections (i.e., connections 14aa, 14ba, 14ca, 16a, 16b, and 16c). The matrix of edge weights for the gateway graph shown in FIG. 4 is denoted as $G_i^{gate}=(V^{gate}, E^{gate}, w_i^{gate})$ where $$M = \prod_{i=1}^{|E^{gate}|} M_i.$$

Once the gateway nodes 20a-f have been identified, a subset $k_1$ of these gateway nodes 20a-f is selected from $V^{gate}$ to act as a set of sensors (step 112). This set of sensors, $S=\{s_1, s_2, \ldots, s_{k1}\}$, measure the arrival times of information (i.e., when and from what connection a particular rumor arrives and a particular gateway node) to estimate which cluster is the most likely candidate cluster. For instance, nodes 20a and 20e may be chosen as sensors to measure the time at which the rumor arrived at them for the first time.

With the measurements obtained from the sensor gateway nodes, the system then uses this information to estimate which cluster is most likely to include the source, making that cluster the candidate cluster (step 114). Since the exact time that a source begins spreading information (e.g. a rumor) is typically unknown, measurements regarding the differences in arrival times of a rumor at sensor pairs, $$\Delta t_{i1} \triangleq (t_i + t^*) - (t_1 + t^*) = t_i - t_1$$

can be used to estimate in which cluster the source is located, where $t_i$ and $t_1$ are the times at which the rumor is received at the $i^{th}$ sensor and the first sensor, respectively.

Let the arrival time difference vector be $\Delta t = (\Delta t_{21}, \Delta t_{31}, \ldots, \Delta t_{k_1 1})$. The observation vector $\Delta t$ depends on $w_i^{gate}$. Given the weight vector $w_i^{gate}$, the arrival time difference vector is multivariate Gaussian, since the individual distributions of the time delay are independent Gaussian themselves.

Due to the lack of prior knowledge as to which node is the source of the rumor, one embodiment of the present invention implements a maximum likelihood estimator ("MLE"), which becomes $$\hat{v}^{(1)} = \arg\max_{v \in V^{gate}} P(\Delta t | v)$$

where $P(\Delta t | v)$ is the probability density function of the observation vector, given v belongs to the cluster contains the source of rumor and the SI model is used. Considering the statistical distribution of $\Delta t$, the optimal MLE for identifying the candidate cluster $\hat{v}^{(1)}$ is calculated using the following:

$$\hat{v}^{(1)} = \arg\max_{v \in V^{gate}} \sum_{i=1}^{M} Pr(G_i^{gate})$$

$$\frac{1}{(2\pi)^{\frac{k_1-1}{2}} \det(\Lambda_{v,i})^{\frac{1}{2}}} \times \exp\left(-\frac{1}{2}(\Delta t - \mu_{v,i})(\Lambda_{v,i})^{-1}(\Delta t - \mu_{v,i})^T\right)$$

where $\mu_{v,i}(r)$ is the mean value of difference in arrival times between the first and the $(r+1)^{th}$ sensors, and $\Lambda_{v,i}(a,b)$ is the cross-correlation of difference in arrival times between the $a^{th}$ and the $b^{th}$ sensors. $Pr(G_i^{gate})$ is the probability of the $i^{th}$ possible gateway graph $G_i^{gate}$. Assuming independence among edges, the probability of the $i^{th}$ possible gateway graph is calculated $$Pr(G_i^{gate}) = \prod_{i=1}^{|E^{gate}|} Pr(w_{ij})$$

as where $w_{ij}(1 \leq i \leq |E^{gate}|)$ are the elements of the $j^{th}$ column of the matrix $W^{gate}$.

Given a typical social network, the number of possible graphs can become extremely large. In order to reduce the complexity of searching for the source of the rumor, one embodiment of the present invention involves searching amongst the m most likely gateway gale graphs corresponding to the m most likely weight vectors $w_i^{gate}$, where m<<M. In such circumstances the MLE calculation for locating the candidate cluster $\hat{v}^{(1)}$ changes to the following:

$$\hat{v}^{(1)} = \arg\max_{v \in V^{gate}} \sum_{i=1}^{m} Pr(G_i^{gate}) \frac{1}{\det(\Lambda_{v,i})^{\frac{1}{2}}} \times \exp\left(-\frac{1}{2}(\Delta t - \mu_{v,i})(\Lambda_{v,i})^{-1}(\Delta t - \mu_{v,i})^T\right)$$

Once the candidate cluster $\hat{v}^{(1)}$ has been identified, the second stage 106 of the system 100 begins. The second stage 106 begins by graphing the nodes of the candidate cluster, $G_i^{cluster} = (V^{cluster}, E^{cluster}, w_i^{cluster})$, and selecting a subset $k_2$ of the nodes of the candidate cluster as a second set of sensors (step 116). Thereafter, similar to step 114, the system 1 searches cluster amongst the m most likely graphs corresponding to the m most likely weight vectors $w_i^{cluster}$ to locate the source of diffusion within the candidate cluster. Thus, the corresponding optimal MLE is given by $$\hat{v}^{(2)} = \arg\max_{v \in V^{cluster}} \sum_{i=1}^{m} Pr(G_i^{cluster}) \frac{1}{\det(\Lambda_{v,i})^{\frac{1}{2}}} \times \exp\left(-\frac{1}{2}(\Delta t - \mu_{v,i})(\Lambda_{v,i})^{-1}(\Delta t - \mu_{v,i})^T\right)$$

where $Pr(G_i^{cluster})$ is the probability of the $i^{th}$ possible gateway graph and $\Delta t$ is the observation vector at the sensors. Note that the optimization problems in the MLEs for $\hat{v}^{(1)}$ and $\hat{v}^{(2)}$ have no closed-form solution, thus a brute-force search is run through all the suspected nodes. The number of suspected nodes is equal to the size of the most likely candidate cluster, which provides the following advantages: (1) the percentage of sensors significantly reduces compared to alternative algorithms discussed in Pinto, P. C., Thiran, P., Vetterli, M.: Locating the source of diffusion in large-scale networks. Phys. Rev. Lett. 109, 068-702 (2012) and Luo, W., Tay, W. P., Leng, M.: How to identify an infection source with limited observations. Selected Topics in Signal Processing, IEEE Journal of 8(4), 586-597 (2014) for the same level of accuracy, which decreases the dimension of the matrix $\Lambda_{v,i}$ in the MLE for $\hat{v}^{(2)}$, thereby reducing the computational complexity thereof; and (2) the likelihood function in the MLE for $\hat{v}^{(2)}$ should be calculated for much smaller number of nodes than all the nodes in the network.

Source Localization Algorithm

In one embodiment, an algorithm is used to identify the source of diffusion in a social network with varying relationship strength. The first stage of the proposed algorithm FindCluster is depicted in Algorithm 1, shown below. As shown in Algorithm 1, the clusters/communities existing in the network are first discovered using the Louvain method. The time complexity of this method O(|V|log|V|) is significantly lower than other methods to compute clusters. The gateway graph is constructed using the gateway nodes of these clusters. The algorithm SampleGraph, as seen in Algorithm 4 shown below, is used to generate m of the most likely gateway graphs corresponding to the m most likely weight vectors. Since it is reasonable to expect that any piece of information flows along the shortest paths into the network, the most appropriate sensor nodes will be the nodes with high betweenness centrality, where betweenness centrality of a node v is defined as $$BC(v) = \sum_{s \neq v \neq t} (N_{s,t}^{SP}(v)/N_{s,t}^{SP}).$$

$N_{s,t}^{SP}(v)$ is the number of shortest paths from s to t passing through node v, and $N_{s,t}^{SP}$ is the total number of shortest paths from node s to node t. The number of shortest paths varies with graph size and connectivity, making it difficult to directly compare betweenness centrality ("BC") values across the possible graphs. Thus, typically analysis focuses on betweenness centrality order, where the nodes are ranked in descending order of BC values, and the node with the highest BC value is given a betweenness centrality score ("BCS") of 1. In this embodiment, although the size of the graph is the same, the varying weights between the nodes imply varying connectivity. Hence, we approximate the expected BCS for each node $v \in V^{gate}$ using the m most likely graphs as $$\overline{BCS(v)} = \sum_{j=1}^{m} Pr(G_j^{gate}) BCS_j^{gate}(v)$$

where $BCS_j^{gate}(v)$ is the BCS for the $v^{th}$ node in the $i^{th}$ possible graph $G_i^{gate}$. The computational complexity is $O(m \cdot |E^{gate}| \cdot |V^{gate}|)$ where $|E^{gate}|$ and $|V^{gate}|$ denote the number of edges and nodes in the graph $G_i^{gate}$, respectively. The algorithm that finds the BCS values, FindBCS, is shown in Algorithm 3 below. As shown in Algorithm 1, FindCluster selects the top $k_1$ nodes with high betweenness centrality (line 4) and then finds the most likely cluster using the MLE for finding the candidate cluster $v^{(1)}$ (lines 7-9). The algorithm FindSource, shown in Algorithm 2 below, implements the second stage of the rumor localization. As with finding the candidate cluster, FindBCS selects $k_2$ nodes from within the candidate cluster as sensors to measure the arrival times of the rumor (line 4 of Algorithm 3). Finally, the node that maximizes the likelihood value (line 9 of Algorithm 2) is chosen as the source of the information (i.e., rumor).

Algorithm 1 Find the most likely candidate cluster

1: procedure FindCluster(V,E,W,m,$k_1$)
2:     $V^{gate}, E^{gate}, W^{gate}$ <- CommunityFinder(V,E,W)
3:     $G_s$ <- SampleGraph($V^{gate}, E^{gate}, W^{gate}$, m), // $G_s$ is the set of the m most likely graphs
4:     sensors <- Top(FindBCS($G_s$), $k_1$)
5:     likelihood <- 0
6:     Compute $\Delta t$
7:     for each node v in $V^{gate}$ do -continued Algorithm 1 Find the most likely candidate cluster

| 8: | Compute likelihood(v) | // using MLE for $\hat{v}^{(1)}$ |
| 9: | $\hat{v}^{(1)}$ <- $\max_{V^{cluster}, E^{cluster}}$(likelihood) | // returns candidate cluster |
| 10: | Return | //returns the graph contains $\hat{v}^{(1)}$ |

Algorithm 2 Find the source of diffusion

```
1: procedure FINDSOURCE(V,E,W, k1, k2,m)
2:    V^cluster, E^cluster <- FindCluster(V, E,W, m, k1)
3:    G_s <-SampleGraph(V^cluster, E^cluster, W^cluster, m)
4:    sensors<-Top(FindBCS(G_s), k2)
5:    likelihood <- 0
6:    Compute Δt
7:    for each node v in V^cluster do
8:        Compute likelihood(v) //using MLE for v^(2)
9:        v^(2) <-max(likelihood)
10:   Return v^(2) // v^(2) is the estimated as the source of the rumor
```

Algorithm 3 Find the betweenness centrality scores

```
1: procedure FINDBCS(G_s)
2:    BCS <- 0                        //initializing the vector
                                       of BCS values
3:    for each graph G^i in G_s do
4:        8C(G^i) <- Betweenness (G^i) //the betweenness centrality
                                       values for the nodes in G^i
5:        BCS(G^i) <- HeapSort(BC(G^i))
6:    for each node v in V do
7:        BCS(v) <- Pr(G^i)BCS_i^G (v) + BCS(v)
8:    Return BCS
```

Algorithm 4 Sample Graph

```
1: procedure SAMPLEGRAPH(V,E,W,m)
2:    GraphDic<-{ }
3:    for each graph G^i in G do        //G is the set of all possible
                                         graphs
4:    GraphDic <- Pr(G^i)               // using Pr(G_i) = ∏_{i=1}^{|E|} Pr(w_{ij})
5:    SortedGraphs <- HeapSort(GraphDic) //sorting possible graphs based
                                          on their probabilities
6:    G_s <-Top(SortedGraphs, m)        //the m most likely graphs
7:    return G_s
```

Example 1

Figure 5:
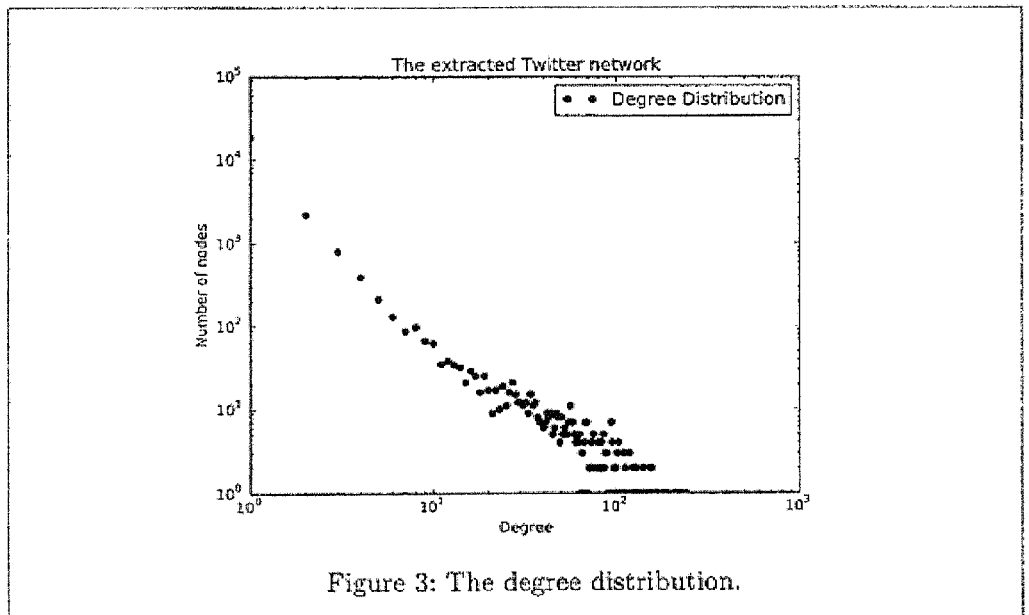
FIG. 5 is a graph of the degree distribution of nodes in an example social network.
Figure 6:
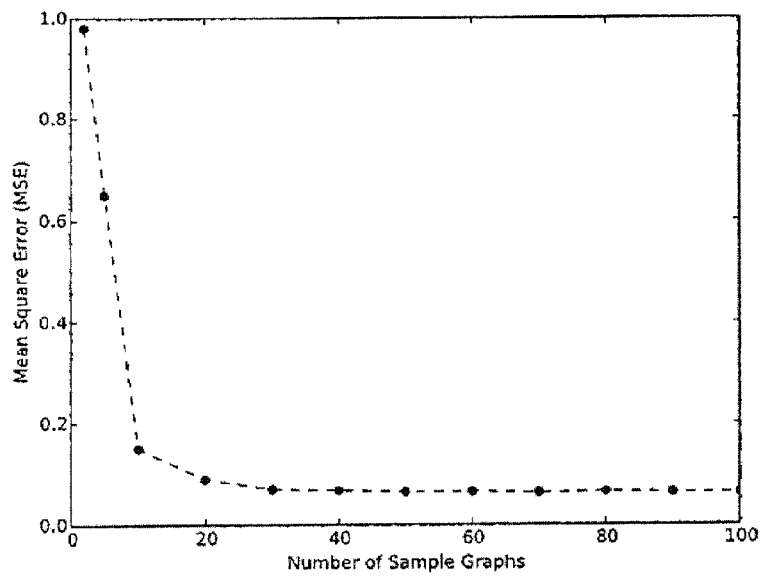
FIG. 6 is a graph showing the mean square error (MSE) against the number of sample graphs from an Example executed according to the process illustrated in FIG. 1.

We performed simulations on a large dataset extracted from the Twitter network. The network is obtained from Twitter users who mentioned "Python" or "data" on their posts and then tracing followers' links up to three hops. The dataset included 23,370 nodes with 33,101 interconnecting edges and had a diameter of 15 nodes. FIG. 5 shows the degree distribution of the network, where the degree distribution approximately follows power law distribution, which is an important characteristic of real social networks.

To quantify the average information propagation delay, we extract the time difference between the time that one node u tweets and the time its neighbor v retweets the u's tweet. The mean shift method is used to cluster the propagation delay values. For each edge $e_i$ we have $$Pr(\mu_i = \mu_{il}) = \frac{n_l}{\sum_{k=1}^{M_i} n_k}$$

where $\mu_{il}$ and $n_l$, $(1 \leq l \leq M_i)$ are the average information propagation delay and the number of points in the $l^{th}$ cluster, respectively. $M_i$ is the total number of clusters. Based on the equation $d_i|w_{ij} \sim N(w_{ij} \cdot \mu_{max}, \sigma_{ij}^2)$, $$w_{ij} = \frac{\mu_{ij}}{\mu_{i1}}$$

where $\mu_{i1} = \max(\mu_{i1}, \mu_{i2}, \ldots, \mu_{iM_i})$.

159 clusters are found using the Louvain method. The average number of nodes in each cluster is 146 nodes. Therefore, on an average, only 146 nodes need to be searched in the second stage which results in low computational complexity.

To find a sufficient number of sample graphs m in the equations above, the k-nearest neighbors in uncertain graphs approach may be used. We ran an experiment in which the average shortest path distance is computed for (i) 500 sample graphs (m=500); and (ii) different sizes of sample graphs ranging from 2 to 100 ($2 \leq m \leq 100$). The average shortest path distance in the first case is given by $$\overline{SPD} = \sum_{G^i \in G_s, |G_s|=500} P(G^i) \overline{SPD(G^i)}$$

where $G_s$ is the set of 500 most likely graphs and $$\overline{SPD(G^i)} = \frac{1}{|V| \cdot (|V|-1)} \sum_{i \in V; i \neq j} \sum_{j \in V} SPD_{ij}$$

is the average shortest path distance in the graph $G^i$ and $SPD_{ij}$ is the shortest path distance between nodes i and j. Similarly, the average shortest path distance in the second case is given by $$\overline{SPD} = \sum_{G^i \in G_s, |G_s|=m} P(G^i) \overline{SPD(G^i)}$$

where m varies between 2 and 100. We then calculate the mean square error (MSE) between the average shortest path distances in the first case (as ground-truth value) and in the second case. Since the MSE converges to 0.05 after 30 sample graphs in FIG. 4, we conclude that 30 sample graphs (m=30) are sufficient for our test needs.

Since there is no prior knowledge of the source of diffusion, we generate a uniformly distributed source in [1,|V|]. We simulate the information spread using the SI model. The following results are obtained by averaging over 100 independent runs. The percentage of sensors is fixed at 0.4%.

Figure 7:
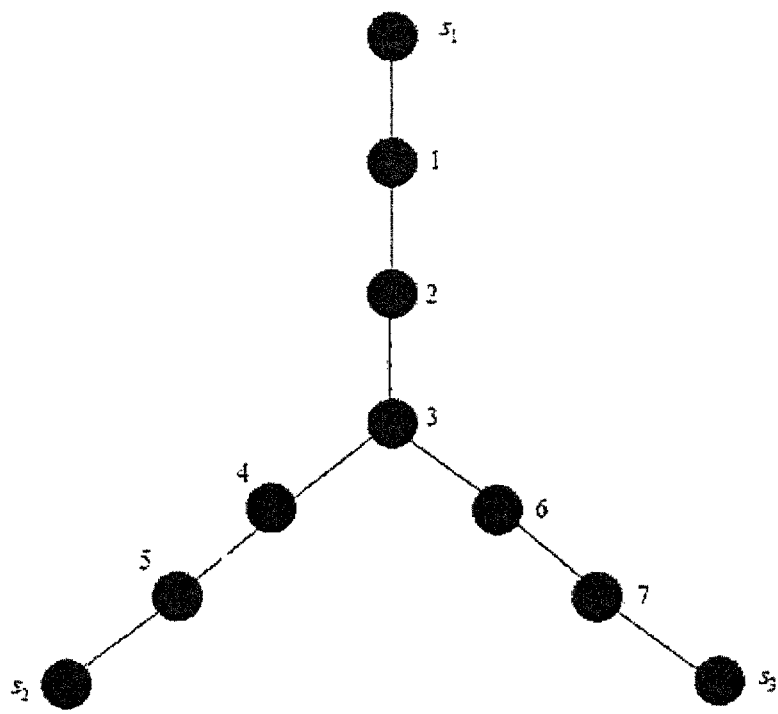
FIG. 7 is a graph with three sensors implemented in a social network in accordance with the process illustrated in FIG. 1.
Figure 8:
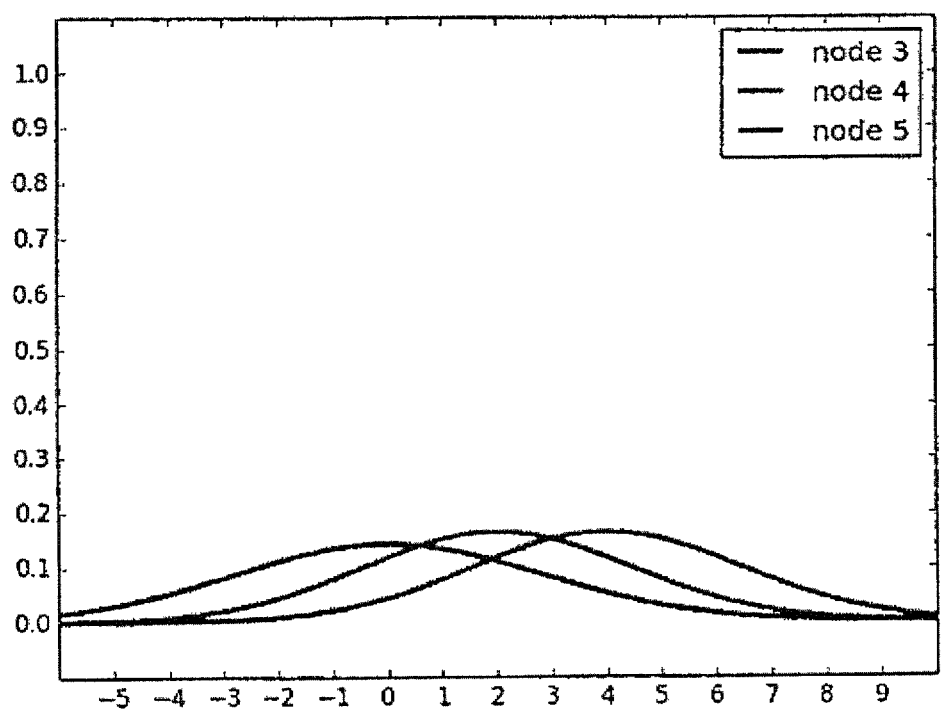
FIG. 8 is a probability density function graph of the difference in arrival times measured by sensors employed according to the process illustrated in FIG. 1.

We investigate the accuracy of the multivariate Gaussian distribution assumption for the observation vector $\Delta t$ in FIG. 7 and FIG. 8. FIG. 7 shows a graph with three sensors $s_1$, $s_2$, and $s_3$ which compute the observation vector $\Delta t = (\Delta t_{21}, \Delta t_{31})$.

FIG. 8 plots the probability density function of $(\Delta t_{21}|v=i)$ for nodes i∈{3,4,5}. The propagation delays along each edge are independent exponential random variables with mean 1. Although the information propagation delay along each edge is not Gaussian distributed, the differences in arrival times at sensors 1 and 2 are approximately Gaussian distributed in FIG. 8.

Figure 9:
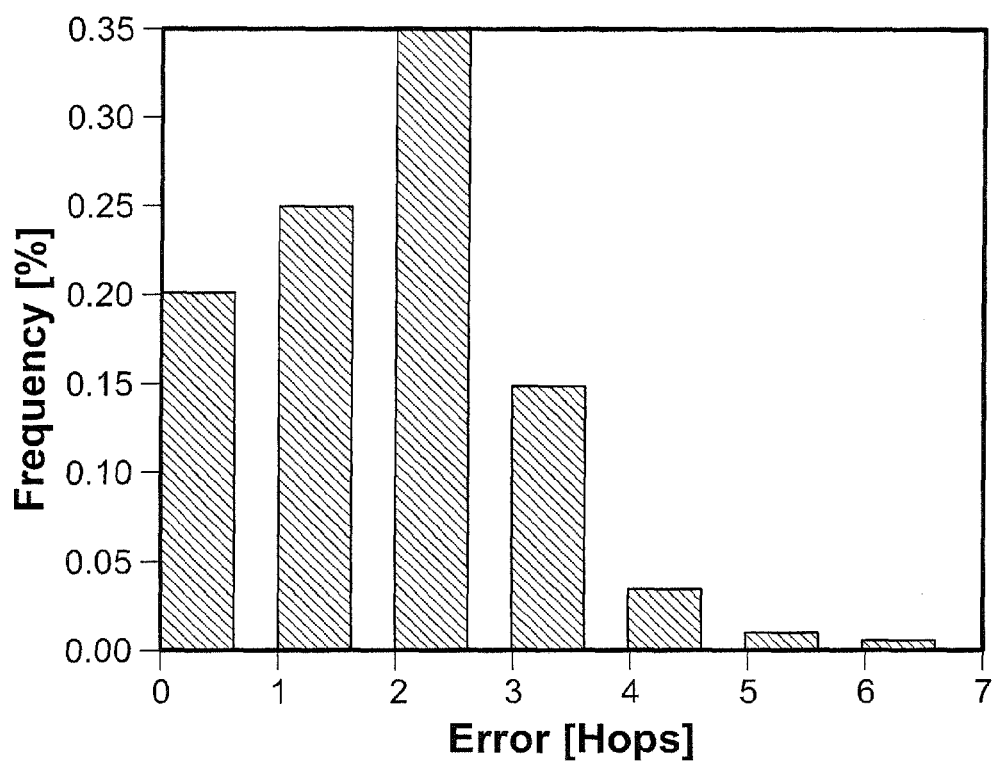
FIG. 9 illustrates a histogram of error in source localization after performing the process shown in FIG. 1 multiple times.

FIG. 9 illustrates the histogram of the error in source localization. This shows that the algorithm is able to pinpoint the source exactly 20% of the time, but 80% of the time, the actual source within 3 hops of the estimated source, when the diameter of the diffusion graph is 15. In the context of a large social network, this is a significant achievement.

Figure 10:
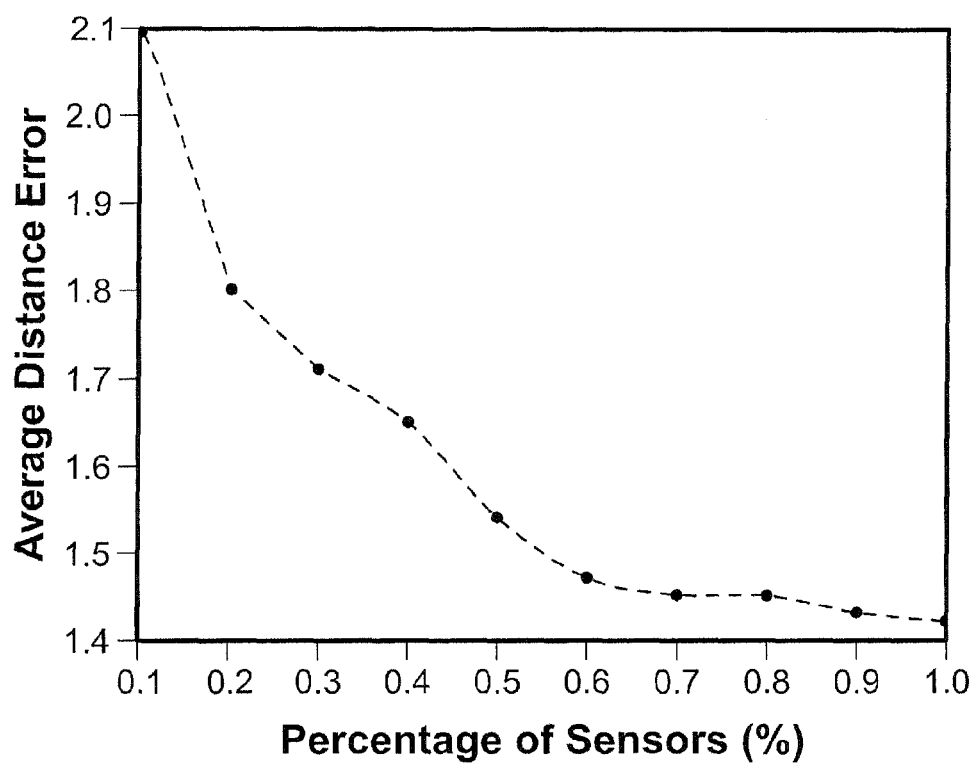
FIG. 10 is a graph showing the effect of varying the percentage of sensors utilized in the process shown in FIG. 1 on the average distance error (i.e., the distance between the actual and estimated sources)

We vary the percentage of sensors from 0.1% to 1.0% to illustrate how this parameter affects the average distance error (the distance between the actual and estimated sources). As seen from FIG. 10, the average distance error reduces sharply with the percentage of sensors and then saturates to a value close to 1.4.

The various embodiments disclosed herein can be implemented as hardware, firmware, software, or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It will be understood that the embodiments described herein are merely exemplary and that a person skilled in the art may make many variations and modifications without departing from the spirit and scope of the invention. All such variations and modifications are intended to be included within the scope of the invention as defined in the appended claims.

We claim:

1. A method of identifying an unknown source of information communicated from an associated source node in a social media network, the method comprising:
  identifying a plurality of node clusters from nodes in the network, including the source node, each of the plurality of node clusters including a plurality of nodes, each of the plurality of nodes from each of the plurality of node clusters having at least one edge connection defined by a connection to a different node from a same one of the node clusters;
  identifying a plurality of gateway nodes from each of the plurality of node clusters, each of the plurality of gateway nodes from each of the plurality of node clusters having at least one weak tie connection with a corresponding gateway node from a different one of the plurality of node clusters;
  selecting a subset of the plurality of gateway nodes as sensor nodes;
  measuring arrival times of the information from the source node at each of the sensor nodes;
  selecting a candidate node cluster from the plurality of node clusters based on high betweenness centrality, the candidate node cluster having a high probability of including the source node from among its corresponding plurality of nodes;
  selecting a subset of the plurality of nodes in the candidate cluster as candidate sensor nodes,
  measuring arrival times of the information from the source node at each of the candidate sensor nodes; and
  selecting a candidate node from the candidate cluster based on high betweenness centrality, the candidate node having a high probability of being the source node,
  wherein betweenness centrality of a node v is defined as $$BC(v) = \sum_{s \neq v \neq t} (N_{s,t}^{SP}(v)/N_{s,t}^{SP}),$$

where $N_{s,t}^{SP}(v)$ is the number of shortest paths from s to t passing through node v, and $N_{s,t}^{SP}$ is the total number of shortest paths from node s to node t; and
  wherein the step of selecting based on betweenness centrality includes determining a betweenness centrality order, where the nodes are ranked in descending order of BC values, and the node with the highest BC value is given a betweenness centrality score ("BCS") of 1, the varying weights between the nodes implying varying connectivity and the expected BCS for each node $v \in V^{gate}$ is approximated using the m most likely graphs as $$\overline{BCS(v)} = \sum_{j=1}^{m} Pr(G_j^{gate})BCS_j^{gate}(v),$$

where $BCS_j^{gate}(v)$ is the BCS for the $v^{th}$ node in the $i^{th}$ possible graph $G_i^{gate}$, the computational complexity is $O(m \cdot |E^{gate}| \cdot |V^{gate}|)$, where $|E^{gate}|$ and $|V^{gate}|$ denote the number of edges and nodes in the graph $G_i^{gate}$, respectively.

2. The method of claim 1, wherein the at least one edge connection is assigned a weight based upon a level of resistance to information being shared across the at least one edge connection.

3. The method of claim 2, wherein, $w_{ij}$ is the weight of the $i^{th}$ connection at some instance j, with the number of distinct values for the weight of the connection i be $M_i$ and $|E| \times M$ is a matrix of weights, $W=[w_1, w_2, \ldots, w_M]$, where $M=\Pi_{i=1}^{|E|} M_i$ and the $i^{th}$ column of this matrix is a vector, $w_i$, with elements representing one possible combination of weights for each connection and further comprising the step of constructing one graph, $G_i=(V, E, w_i)$ for every vector $w_i$, where V and E denote the set of nodes and connections, respectively.

4. The method of claim 3, wherein, given weight independence among connections, the probability of occurrence of graph $G_i$ is given by the formula:

$$Pr(G_i) = \prod_{i=1}^{|E|} Pr(w_{ij}).$$

5. The method of claim 2, wherein, a time to communicate information from a node to another node is an indication of tie strength between the nodes.

6. The method of claim 5, wherein, given a Gaussian distribution for the information propagation delay along each edge $e_i \in E$, the time, $d_i$, it takes for information from the corresponding node to reach its susceptible neighbor when the weight of the tie is $w_{ij}$ is statistically distributed in accordance with the equation:

$$d_i = |w_{ij} \sim N(w_{ij} \cdot \mu_{max}, \sigma_{ij}^2),$$

where the average information propagation delay for the weakest social relationship ($w_{ij}=1$) is $\mu_{max}$.

7. The method of claim 1, wherein, the step of selecting a candidate node cluster implements a maximum likelihood estimator ("MLE"), which becomes $$\hat{v}^{(1)} = \underset{v \in V^{gate}}{\arg\max} P(\Delta t \mid v)$$

where $P(\Delta t|v)$ is the probability density function of the observation vector, given v belongs to the cluster contains the source of rumor and the SI model is used.

8. The method of claim 7, wherein, considering the statistical distribution of $\Delta t$, the optimal MLE for identifying the candidate cluster $\hat{v}^{(1)}$ is calculated using the following:

$$\hat{v}^{(1)} = \underset{v \in V^{gate}}{\arg\max} \sum_{i=1}^{M} Pr(G_i^{gate})$$

$$\frac{1}{(2\pi)^{\frac{k_1-1}{2}} \det(\Lambda_{v,i})^{\frac{1}{2}}} \times \exp\left(-\frac{1}{2}(\Delta t - \mu_{v,i})(\Lambda_{v,i})^{-1}(\Delta t - \mu_{v,i})^T\right)$$

where $\mu_{v,i}(r)$ the mean value of difference in arrival times between the first and the $(r+1)^{th}$ sensors, and $\Lambda_{v,i}(a,b)$ is the cross-correlation of difference in arrival times between the $a^{th}$ and the $b^{th}$ sensors and $Pr(G_i^{gate})$ is the probability of the $i^{th}$ possible gateway graph $G_i^{gate}$.

9. The method of claim 8, wherein, given independence among edges, the probability of the $i^{th}$ possible gateway graph is calculated $$Pr(G_i^{gate}) = \prod_{i=1}^{|E^{gate}|} Pr(w_{ij})$$

as where $w_{ij}$ ($1 \leq i \leq |E^{gate}|$) are the elements of the $j^{th}$ column of the matrix $W^{gate}$.

10. The method of claim 7, further comprising the step of reducing the complexity of searching for the source of the rumor by searching among the m most likely gateway graphs corresponding to the m most likely weight vectors $w_i^{gate}$, where m<<M, where the MLE calculation for locating the candidate cluster $\hat{v}^{(1)}$ is:

$$\hat{v}^{(1)} = $$

$$\underset{v \in V^{gate}}{\arg\max} \sum_{i=1}^{m} Pr(G_i^{gate}) \frac{1}{\det(\Lambda_{v,i})^{\frac{1}{2}}} \times \exp\left(-\frac{1}{2}(\Delta t - \mu_{v,i})(\Lambda_{v,i})^{-1}(\Delta t - \mu_{v,i})^T\right).$$

11. The method of claim 1, wherein, the steps of identifying node clusters and identifying gateway nodes include graphing nodes of the node clusters and graphing the gateway nodes, respectively.

12. The method of claim 1, wherein, the step of identifying node clusters is by identifying strong ties between nodes.

13. The method of claim 1, further comprising the step of storing time stamped records of information transmissions between nodes in a database and wherein the step of measuring arrival time includes the step of retrieving the time stamped data from the database and comparing the time of transmission for a given information transmission and the arrival time at the node at which the information is received.

* * * * *